Dec. 1, 1964   R. H. McPHERSON   3,158,902
APPARATUS FOR MOLDING DESIGNS IN PRESSED-WOOD
Filed Dec. 15, 1961   2 Sheets-Sheet 1
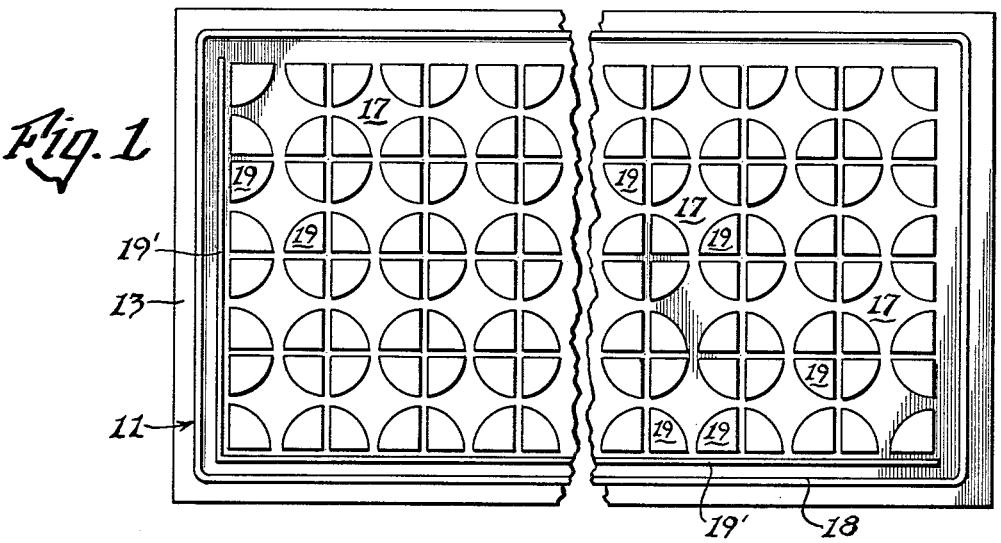
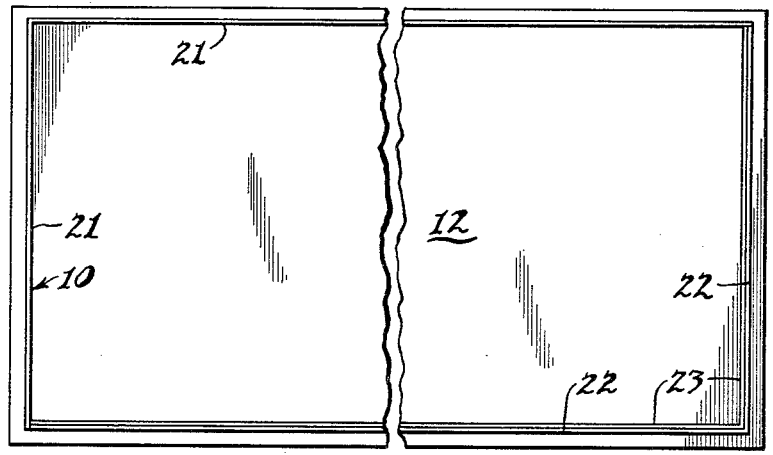
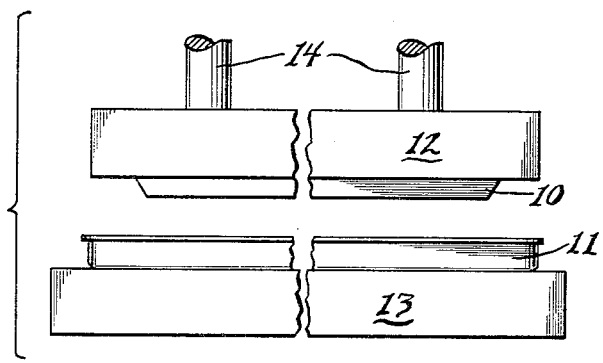
INVENTOR
ROMAN H. McPHERSON
BY
Harrington A. Lackey
ATTORNEY Dec. 1, 1964  R. H. McPHERSON  3,158,902
APPARATUS FOR MOLDING DESIGNS IN PRESSED-WOOD
Filed Dec. 15, 1961  2 Sheets-Sheet 2
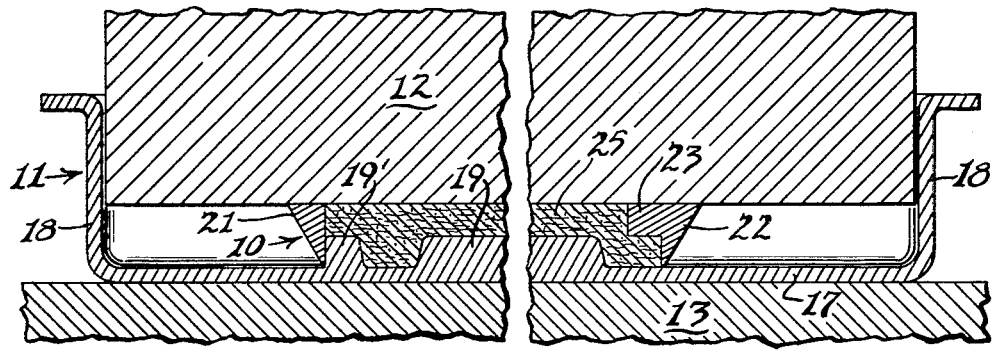
Fig. 4
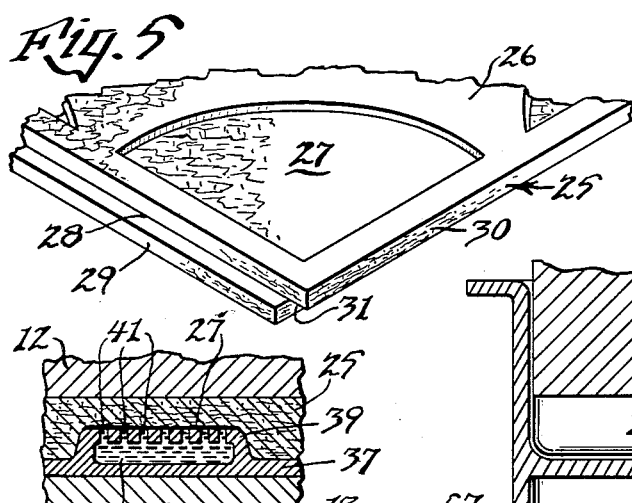
Fig. 5
Fig. 6
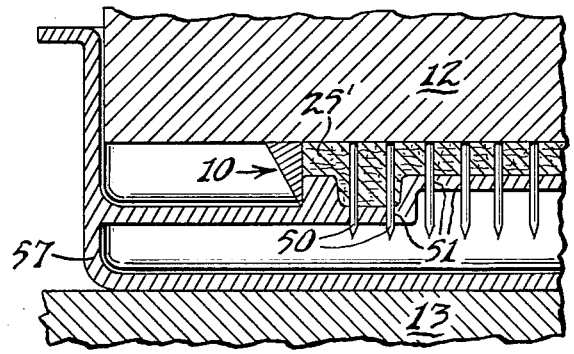
Fig. 8
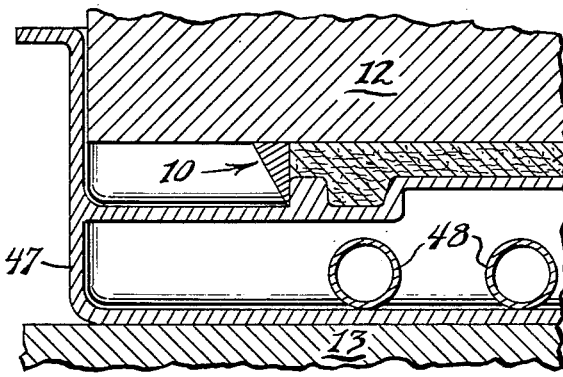
Fig. 7
INVENTOR
ROMAN H. McPHERSON
BY
Harrington A. Lackey
ATTORNEY

United States Patent Office 3,158,902
Patented Dec. 1, 1964

3,158,902
APPARATUS FOR MOLDING DESIGNS IN PRESSED-WOOD
Roman H. McPherson, Nashville, Tenn., assignor to Deco Engineering, Inc., Nashville, Tenn., a corporation of Tennessee
Filed Dec. 15, 1961, Ser. No. 159,551
2 Claims. (Cl. 18—16)

This invention relates to an apparatus for forming designs in plastic material, and more particularly to an apparatus for molding designs in a rigid composition of wood chips and resin, known as pressed-wood.

Although the art of compressing compositions of wood chips and resin to form pressed-wood products is fairly well developed, still a method of simultaneously molding designs in pressed-wood products has defied the industry. It is true that designs may be formed in the pressed boards and panels after they have been molded by various means of cutting the patterns in the surface of the wood. However, efforts to mold the design in the pressed-wood by machining the desired patterns in the face of the platens which compress the wood composition, have resulted in total failure. Not only have such efforts resulted in failure in material, but also such a method would require a very expensive platen for each design, even if successful. It is therefore an object of this invention to overcome the disadvantages enumerated by providing a novel device which may be incorporated in existing platens for forming or molding any desired pattern in a pressed-wood product.

Another object of this invention is to provide cauls of novel construction which are adapted to cooperate with conventional platens to form designs in pressed-wood products.

A further object of this invention is to provide specially constructed cauls for forming designs in the faces and for molding lap joints in the edges of pressed-wood panels.

Another object of this invention is to provide an apparatus for molding designs in pressed-wood products and also for simultaneously painting selected design areas on the products.

Another object of this invention is to provide an apparatus for molding designs in pressed-wood products, including a means for heating the compressed wood composition to reduce the molding time.

A further object of this invention is to provide an apparatus for manufacturing perforated pressed-wood products.

Further objects and advantages of the invention will be apparent from the following description taken in conjunction with the drawings, wherein:

FIG. 1 is the top plan view of a lower caul made in accordance with this invention supported on a lower platen;

FIG. 2 is a bottom plan view of an upper caul made in accordance with this invention supported on an upper platen;

FIG. 3 is a side assembly elevation of the platens and cauls in raised inoperative position;

FIG. 4 is a fragmentary cross-sectional elevation of the platens and the cauls in the lowermost operative position for fully compressing a wood composition;

FIG. 5 is a fragmentary perspective view of a pressed-wood product incorporating a design made in accordance with this invention;

FIG. 6 is a fragmentary sectional elevation similar to FIG. 4 showing a modification for coating the pressed-wood;

FIG. 7 is a sectional elevation showing another modification of the invention for heating the lower caul;

FIG. 8 is a sectional side elevation of a further modification of the invention for perforating the pressed-wood product.

Referring now to the drawings in more detail, the apparatus comprises an upper caul 10 and a lower caul 11 of novel construction adapted to be mounted on or supported between a conventional upper platen 12 and a lower platen 13, respectively. The lower platen 13 is preferably stationary, while the upper platen 12 is adapted to be moved toward and away from the lower platen 13 by any conventional means such as the hydraulic pistons 14.

The lower caul 11 resembles a pan, having a bottom wall 17, and side walls 18. Any pattern desired to be molded in the face of a pressed-wood product is effected by raised areas 19 on the upper surface of the wall 17. These raised areas 19 may be originally formed on the bottom wall 17 by casting, stamping, or otherwise, or they may be formed by welding raised strips of metal to the surface of the bottom wall 17.

Although the upper caul 10 may be of any desired shape, it is disclosed in the drawings as rectangular, comprising adjacent side and end walls 21 having a right-triangular cross-section. The opposite adjacent end and side walls 22 have a somewhat similar cross-section with an inwardly extending rectangular portion 23. The upper caul 10 may be adapted to be permanently secured to the lower face of the upper platen 12, while the lower caul 11 may be permanently secured to the upper face of the lower platen 13 in complementary alignment with the upper caul 10. It is also within the scope of this invention for both the upper and lower cauls 10 and 11 to be initially placed in engagement with each other and merely rest between, but unattached to the platens.

The operation of the invention is as follows:

Assuming that the upper caul 10 is attached to the upper platen 12, and that the lower caul 11 is supported on the lower platen 13 in alignment with the upper caul 10, the platens and cauls will assume the initial raised position disclosed in FIG. 3. Any plastic material or wood mixture 25 of any desired composition, such as a mixture of wood chips and resin, is poured into the lower caul 11 in such abundance that the mixture 25 will completely cover the patterned area of the bottom wall 17 and rise to a height two or three times the depth of the upper caul 10. After the mixture 25 has been poured, the upper platen 12 is moved downwardly to engage and compress the mixture between the upper platen 12, the upper caul 10 and the lower caul 11.

It will be noted that the side walls 21 and 22 are wedge-shaped so that the outer surfaces slope downwardly and inwardly to intersect the substantially vertical inner surfaces of the walls to thrust the excess mixture of wood chips and resin away from the walls 21 and 22. With the upper platen 12 in its lower-most position, the bottom edges of the side walls 21 and 22 must engage the bottom wall 17 of the lower caul 11 so that the mixture 25 will be completely contained.

After the upper platen 12 has been maintained in its lower-most position for about four to seven minutes, and under a pressure of approximately 300 p.s.i. The upper platen 12 is raised and the molded wooden mixture 25 is removed as a hardened panel or other pressed-wood product, having the same design as the pattern incorporated on the surface of the bottom wall 17 of the lower caul 11. Thus, the location of the raised areas 19 will determine the pattern of raised areas 26 and recesses 27 in the pressed-wood panel 25.

One side edge and an adjacent end edge of the panel 25 have an upper recess 28 and a lower tongue 29 formed by the upper caul wall 21 and the raised bar 19'. The opposite side edge and end edge of the panel 25 have an upper tongue 30 and a lower recess 31 formed by the upper caul walls 22 and extended portions 23. FIG. 2 discloses the disposition of the side and end walls 21 and the opposite side and end walls 22 on the upper caul 10.

FIG. 6 is a modified form of the raised area 39 in the bottom wall 37 of the lower caul. The raised area 39 is provided with a cavity 40 for receiving any type of coating fluid, such as paint, and is also provided with the discharge apertures 41 for introducing the fluid to the recessed area 27 of the wood product 25.

FIG. 7 discloses another modification of the lower caul in which the bottom wall 47 is hollow to contain heating elements, such as the steam pipes 48. The hollow bottom 47 could also contain other types of heating elements, such as electrical coils. The purpose of this modification is to apply heat to the upper surface of the lower caul to accelerate the curing and reduce the processing time by as much as 50%.

A further modification of the invention is disclosed in FIG. 8, whereby perforated pressed-wood products may be formed. In this modification, spikes 50 depend from the surface of the upper platen 12 and are substantially longer than the depth of the upper caul 10. The bottom wall 57 of the lower caul is also hollow and the upper surface is provided with apertures 51 adapted to receive the spikes 50 when the upper platen 12 has descended to its lowermost position. In this manner perforations are formed entirely through the pressed-wood 25' at the same time that the wood mixture is being molded into its final design.

In order to facilitate the removal of the molded board 25 from the lower caul 11, the edges of the raised areas 19 and 19' should taper outwardly at an angle of 5–10° from the vertical.

This invention therefore provides a novel and inexpensive apparatus for producing an infinite variety of designs in pressed-wood products simultaneously as they are molded.

Although only the design disclosed in FIGS. 1 and 5 are disclosed in the drawings, any number of designs having raised and depressed areas, such as various types of brick and mortar joint designs, can be comprehended. By utilizing the modification disclosed in FIG. 6, all recessed areas 27 may be painted a different color from the raised areas 26. For example, the mortar joints in a brick design could be easily painted white at the same time that the pressed-wood panels are molded.

It would also be within the scope of this invention to simultaneously mold the product and paint its entire surface by employing the modified lower caul of FIG. 8 with smaller holes 51 for introducing the paint to the wood surface. The spikes 50 would, of course, have to be eliminated for this purpose.

It will be apparent to those skilled in the art that various changes may be made in the invention without departing from the spirit and scope thereof, and therefore the invention is not limited by that which is shown in the drawings and described in the specification, but only as indicated in the appended claims.

What is claimed is:

1. An apparatus for molding wood composition to form a design in a pressed-wood product comprising, upper and lower platens having opposing flat surfaces, a lower caul having a bottom wall supported on said lower platen, the upper face of said bottom wall having selectively raised and depressed surfaces, an upper caul comprising side walls having outside surfaces and inside surfaces, the outside surfaces tapering downwardly to intersect the inside surfaces to form a bottom edge for engaging said bottom wall, said inside surfaces being adapted to form the side edges of said pressed-wood product, and means for moving said upper platen toward said lower platen to compress said composition between said cauls.

2. The invention according to claim 1 in which the raised surfaces of said bottom wall are hollow and have perforations therethrough large enough to permit the passage of fluid, and means for applying fluid through said perforations to coat the areas of said composition in contact with said raised surfaces.

References Cited in the file of this patent

UNITED STATES PATENTS

| 1,586,076 | Dickey | May 25, 1926 |
| 1,688,232 | Harkin | Oct. 16, 1928 |
| 2,071,734 | Dempsey | Feb. 23, 1937 |
| 2,186,331 | Flood | Jan. 9, 1940 |
| 2,500,895 | Davies | Mar. 14, 1950 |
| 2,797,442 | Wagner | July 2, 1957 |
| 2,895,324 | Rosensweig | July 21, 1959 |
| 3,058,154 | Howard et al. | Oct. 16, 1962 |

FOREIGN PATENTS

| 532,991 | Canada | Nov. 13, 1956 |
| 720,915 | Great Britain | Dec. 29, 1954 |